(12) United States Patent
Samudrala et al.

(10) Patent No.: US 8,984,010 B2
(45) Date of Patent: Mar. 17, 2015

(54) BUILD POOLED DATA SOURCE BASED ON HANA SAML LOGIN

(71) Applicant: Business Objects Software Ltd., Dublin (IE)

(72) Inventors: Anil Samudrala, Newark, CA (US); Enping Tu, Cupertino, CA (US); Ning Li, Saratoga, CA (US)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 13/670,255

(22) Filed: Nov. 6, 2012

(65) Prior Publication Data
US 2014/0129592 A1  May 8, 2014

(51) Int. Cl.
*G06F 17/30* (2006.01)
*G06F 21/60* (2013.01)

(52) U.S. Cl.
CPC .................................... *G06F 21/60* (2013.01)

USPC ......................................................... 707/783

(58) Field of Classification Search
CPC ....................................................... G06F 17/30
USPC ......................................................... 707/783
See application file for complete search history.

(56) References Cited

U.S. PATENT DOCUMENTS

| | | | |
|---|---|---|---|
| 8,346,929 B1 * | 1/2013 | Lai | 709/226 |
| 2005/0044197 A1 * | 2/2005 | Lai | 709/223 |
| 2005/0262362 A1 * | 11/2005 | Patrick et al. | 713/193 |
| 2007/0005801 A1 * | 1/2007 | Kumar et al. | 709/238 |
| 2007/0255841 A1 * | 11/2007 | Chong | 709/229 |

* cited by examiner

*Primary Examiner* — Joshua Bullock
(74) *Attorney, Agent, or Firm* — Schwegman Lundberg & Woessner, P.A.

(57) ABSTRACT

A system receives a request from a request processor of a database connection pool to access a database. The system determines whether a database connection from the database connection pool is available for the request. A new security assertion mark-up language (SAML) assertion is generated when the database connection pool does not have an available database connection for the request. A new database connection to the database is built using the new SAML assertion.

20 Claims, 4 Drawing Sheets

BUILD POOLED DATA SOURCE BASED ON HANA SAML LOGIN

FIELD

The present disclosure relates generally to database access, and in a specific example embodiment, to a pooled database connection based on single sign on login.

BACKGROUND

Some enterprise policies require that passwords be changed every few weeks. When a username/password mode is used to build a pooled database connection, the usernames and passwords stored in a configuration file or a database also have to be modified to reflect passwords changes as prescribed by the enterprise policies. Maintaining and storing such changes to the passwords used to establish pooled database connections can be expensive, error prone, and tedious.

BRIEF DESCRIPTION OF DRAWINGS

The appended drawings merely illustrate simple embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures, and techniques have not been shown in detail.

Examples of a system and method for a pooled database connection based on single sign on login are described. In one example embodiment, a request to access a database is received from a request processor of a database connection pool. The system determines whether a database connection from the database connection pool is available for the request. A new security assertion mark-up language (SAML) assertion is generated when the database connection pool does not have an available database connection for the request. A new database connection to the database is built using the new SAML assertion.

Figure 1:
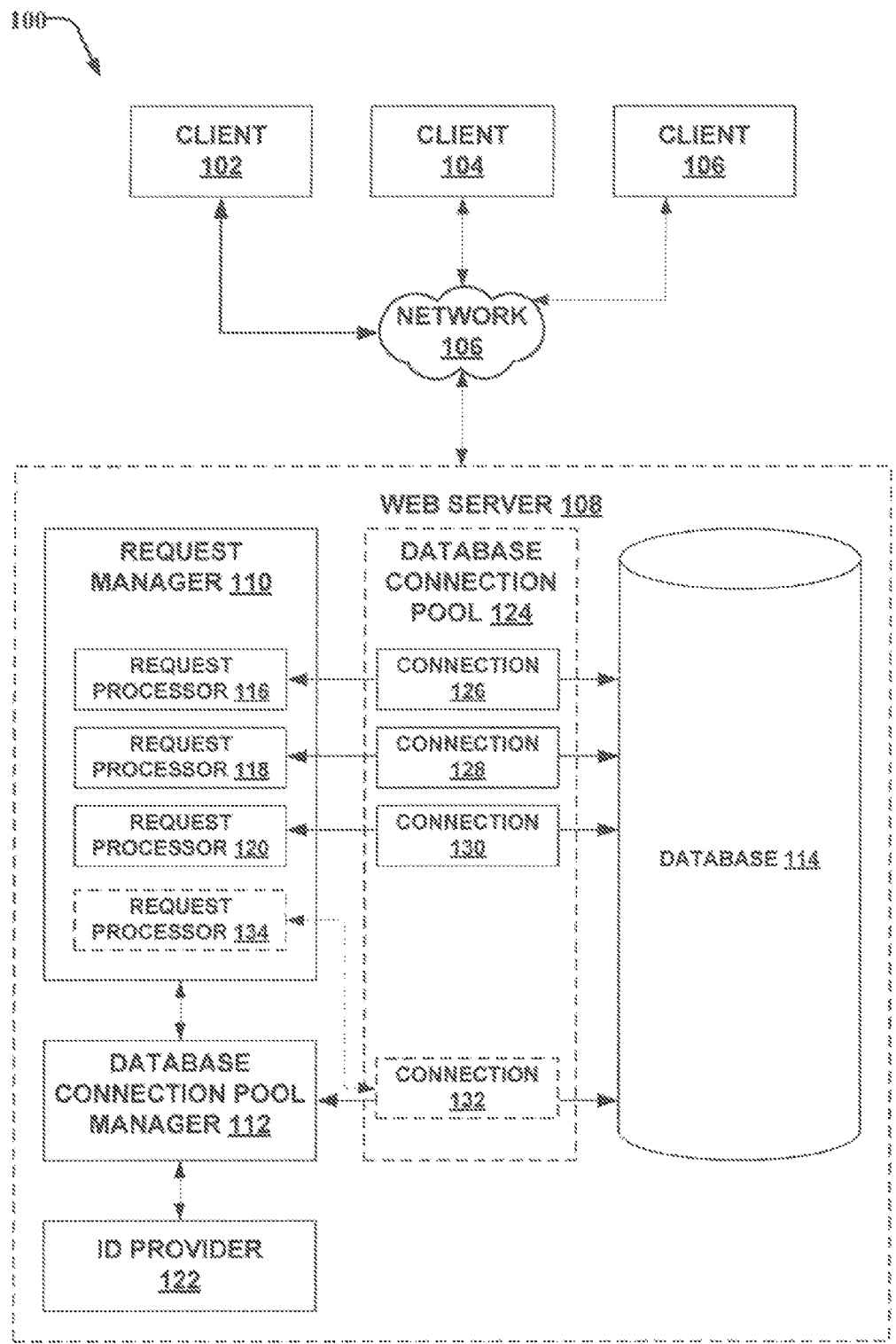
FIG. 1 is a block diagram illustrating an example of a system in which embodiments may be practiced.

With reference to FIG. 1, a system 100 in which example embodiments may be practiced is shown. The system 100 comprises clients 102, 104, 106 accessing database 114 with the web server 108. Clients 102, 104, and 106 are communicatively coupled to the web server 108 via a computer network 106. The computer network 106 may comprise, for example, one or more of a wired or wireless network, a local area network (LAN), or a wide area network (WAN). While the example embodiment of FIG. 1 shows a request manager 110 and a database connection pool manager 112 in one server system (e.g., web server 108), alternative embodiments may contemplate the various components of the request manager 110 and the database connection pool manager 122 being embodied within several systems (e.g., cloud computing system, server farm system).

In one embodiment, the web server 108 includes the request manager 110, the database connection pool manager 112, and the database 114. The request manager 110 receives requests from clients 102, 104, and 106 to connect and access the database 114.

The request manager 110 accesses a database connection pool 124 comprising a cache of database connections 126, 128, 130 maintained so that the database connections 126, 128, 130 can be reused when future requests from the request manager 110 to the database 114 are made. Database connection pool 124 may be used to enhance the performance of executing commands on the database 114. Opening and maintaining a database connection for each user or client 102, 104, 106, especially such as in a dynamic database-driven web server application, can be costly and waste resources. In database connection pooling, after a database connection (e.g., connectors 126, 128, 130) is created, the database connection is placed in the database pool 124 and may be used again so that a new database connection does not have to be created. If all the database connections 126, 128, 130 are being used, a new database connection 132 may be created and added to the database connection pool 124. The database connection pool 124 also cuts down on the amount of time clients 102, 104, 106 wait to establish a database connection to the database 114.

The pooling of database connections in the database connection 124 may be managed by a database connection pool manager 112 that could be used in web-based and enterprise applications of the web server 101 (or an application server). Dynamic web pages can be coded to open a database connection and close the database connection. Transparent to clients 102, 104, 106, when a new database connection is requested, an available database connection is returned from the connection pool 124 maintained by the database connection pool manager 112 of web server 108 in response to the request. Similarly, when a database connection is closed, that database connection may actually be returned to the connection pool 124.

Database connection pooling is not only limited to using application servers such in web server 108, but traditional applications that need frequent access to the database 114 can also benefit from the database connection pool 124. Such requests were traditionally handled by manually maintaining database connections resulting in complicating programming as the framework for pooling can be highly complex. In other embodiment, third-party libraries may be used to allow connection pooling to the database 114 as well as SQL statement pooling, thus allowing for better performance in database intensive applications.

Various parameters such as number of minimum connections, maximum connections and idle connections can be set to make sure the connection pool works well according to the environment it is deployed to work in.

In the example of FIG. 1, clients connect to the database 114 using a corresponding request processor associated with a database connection. For example, clients 102, 104, and 106 respectively connect to the database 114 using request processors 116, 118, and 120 having corresponding database connections 126, 128, and 130.

In one embodiment, clients 102, 104, 106 access the database 114 using a single sign on (SSO) scheme, such as security assertion mark-up language (SAML). SAML is an XML-based data format for exchanging authentication and authorization data between parties, in particular, between an identity provider and a service provider. For example, the identity provider may be the ID provider 122, and the service provider may be the database 114.

SAML specification defines three roles: the principal (clients 102, 104, 106), the identity provider (ID provider 122), and the service provider (database 114). For example, client 102 requests a service (access data from the database 114) from the web server 108. The web server 108 requests and obtains a SAML assertion from the ID provider 122. On the basis of this assertion, the web server 108 can decide whether to perform some service (access data) for the client 102.

Before delivering the identity assertion to the web server 108, the ID provider 122 may request some information from the client 102 (e.g., user name and password) in order to authenticate the client 102. SAML specifies the assertions between the three parties: in particular, the messages that assert identity that are passed from the ID provider 122 to the web server 108. As such, SAML assertion for a database user from client 102 can be used to logon to the database 114 without requiring the user at client 102 to provide a database password to the database 114.

In one embodiment, the database logon for the database 114 may include a username/password logon scheme. To implement a SAML logon scheme, the username and password to access the database 114 may be set as follows:

```
username = ""
password = <SAML_ASSERTION>
```

In another embodiment, the SAML assertion may expire within a configurable predefined time (e.g., 10 minutes). This may be akin to changing the username and password every 10 minutes. For security consideration, the database 114 may be configured to only allow user logon with SAML assertion.

Because some enterprise policies may require changing passwords at least once every few months. If the "username/password" mode were to be used to build the database connection pool 124, one would have to keep changing username/password stored in either a configuration file or the database 114. This is expensive, error prone, and tedious.

In order to use a "username/password" mode, the passwords have to be stored in either a configuration file or the database 114. Although password can be stored encrypted, it is not desirable to store the passwords on the web server 106 to minimize risk.

As such, in one embodiment, the web server 108 provides a SAML login mechanism. To build a database connection, the "username/password" can be set to "<empty string>/<saml assertion>" in the database connection properties. Because a SAML assertion expires within a relatively short period of time (e.g., 10 minutes), credential leaking issue can be prevented.

Generally, when one database connection in the database connection pool 124 is dropped for some reason, the database connection pool manager 112 is able to create a new connection 132 for the database connection pool 124 seamlessly. However, some pooling schemes request that both username and password pair be stored in memory when creating a database connection pool, and use the stored username and password pair to build new database connections. This mechanism requires the stored username/password pair valid in the life cycle of application.

For example, when changing username/password, for example, Apache database pool scheme would drop all current database connections 126, 128, and 130 in the database connection pool 124 and rebuild the entire database connection pool based on the new username/password pairs. Such rebuilding process can be quite expensive and time consuming.

In contrast, the present database connection pool manager 112 operates by replacing a dropped database connection in the database connection pool with a newly built database connection 132 without dropping the existing database connection 126, 128, and 130 in the database connection pool 124. In other words, the existing good connections 126, 128, 130 in the database connection pool 124 are kept alive when building or generating the new database connection 132.

In one embodiment, if a database connection from the database connection pool 124 is not available in response to a request of the request manager 110, the database connection pool manager 112 asks the ID provider 122 for a new SAML assertion to build the new database connection 132. The database connection pool manager 112 then connects the new database connection 132 with the database 114. The successful new database connection 132 is returned to the new request processor 134 from the request manager 110. The new request processor 134 can then use the new database connection 132 to send requests to the database 114.

The following is an example of a source code for the database connection pool manager 112 to obtain a new SAML assertion every time a new database connection is opened while keeping existing database connections in the database connection pool 124 alive.

In particular, the following example source code attempts to overwrite ConnectionFactory class used by BasicDataSource. In particular, the following source code segment generates an object that provides connection properties (e.g., username and password) in runtime and provides SAML assertion:

```
public class HanaDriverConnectionFactory extends
DriverConnectionFactory {
protected RuntimeConnPropProvider _connPropProvider;
```

The following example source code segment generates a customized connection factory with a customized connection provider:

```
public HanaDriverConnectionFactory(Driver driver, String connectUri,
Properties props,
RuntimeConnPropProvider connPropProvider) {
super(driver, connectUri, props);
_connPropProvider = connPropProvider;
}
public Connection createConnection( ) throws SQLException {
```

The following example source code segment overwrites createConnection method inherited from a parent. In this case, it creates connection by using "username/password" (i.e. SAML assertion) generated by _connPropProvider:

```
if(_connPropProvider!=null){
if(_connPropProvider.getUserName( )!=null) _props.setProperty
```

```
("user",__connPropProvider.getUserName( ));
    if(__connPropProvider.getPassword( )!=null) __props.setProperty
("password",__connPropProvider.getPassword( ));
    }
    return super.createConnection( );
    }
}
```

The following example source code segment defines BasicDataSource to implement javax.sql.DataSource and provides a "one stop shopping" solution for basic data source requirements. For example, HanaBasicDataSource extends BasicDataSource and replaces its conncectionFactory with a customized one, which builds connection with a Runtime-ConnPropProvider object providing SAML assertion in runtime:

```
public class HanaBasicDataSource extends BasicDataSource {
public static final String HANA_DATASOURCE_VALIDATION_SQL = "select 1 from dummy";
protected RuntimeConnPropProvider __connPropProvider;
public HanaBasicDataSource(RuntimeConnPropProvider connPropProvider){
__connPropProvider = connPropProvider;
if (__connPropProvider!=null && __connPropProvider.getUri( )!=null){
this.url = __connPropProvider.getUri( );
}
}
```

The following example source code segment replaces the default connectionFactory in BasicDataSource with the customized one. For example, the customized connectionFactory builds connection with a RuntimeConnPropProvider object providing SAML assertion in runtime:

```
protected ConnectionFactory createConnectionFactory( ) throws
SQLException {
super.createConnectionFactory( );
HanaDriverConnectionFactory myFactory = new
HanaDriverConnectionFactory(DriverManager.getDriver(url), url,
connectionProperties,
__connPropProvider);
return myFactory;
}
}
```

The following is an example of a code snippet illustrating a change in username and password properties in the lowest level. The property values may be provided at runtime. For instance, generic interface provides connection properties (uri, username, password) in runtime:

```
public interface RuntimeConnPropProvider {
public String getUri( );
public String getUserName( );
public String getPassword( );
}
```

The following is an example of a code snippet illustrating special provider providing an empty string as username and an SAML assertion as password:

```
public class HanaSamlAssertionProvider implements
RuntimeConnPropProvider {
...
@Override
public String getUserName( ){
    return ""; //always return "" for SSO
}
@Override
public String getPassword( ) {
```

The following is an example of a code snippet illustrates getting a DB (database) username:

```
String dbUserName = ... ;
...
//generate SAML assertion for the DB user
```

The following is an example of a code snippet illustrates generating a SAML assertion for the DB user:

```
return AssertionGeneratorForHANA.generate(dbUserName);
}
...
}
```

Figure 2:
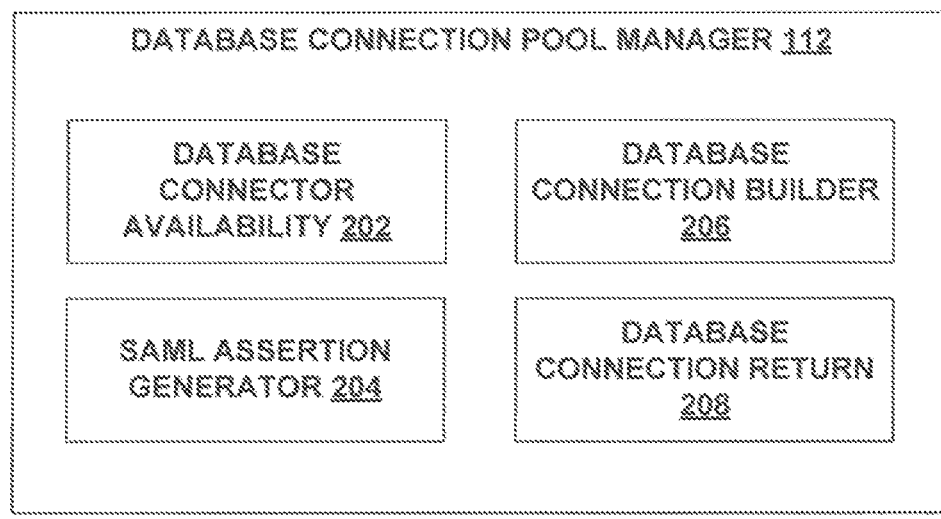
FIG. 2 is a block diagram illustrating an example embodiment of a database connection pool manager.

FIG. 2 is a block diagram illustrating an example embodiment of the database connection pool manager 112. The database connection pool manager 112 includes a database connection availability module 202, a SAML assertion generator 204, a database connection builder 206, and a database connection return module 205.

The database connection availability module 202 may be configured to determine whether a database connection is available from the database connection pool 124 for a request processor of the request manager 110. For example, a load balancer may be coupled to the request manager 110 to manage requests from clients 102, 104, and 106 to the database 112.

The SAML assertion generator 204 is configured to obtain a new SAML assertion from an identity provider. For example, if the database connection availability module 202 determines that no database connections in the database connection pool 124 are available or free to attend to a request processor from the request manager 110, the SAML assertion generator 204 requests the identity provider (e.g., ID provider 122) for a new SAML assertion. For example, the ID provider 122 follows SAML OASIS standard to generate the SAML assertion.

The database connection builder 206 opens a new database connection with the database 112 based on the new SAML assertion. Once the new database connection has been established, it will stay valid the same as a database connection established through username and password. The life cycle of the new database connection is irrelevant to the life cycle of the new SAML assertion.

The database connection return module 208 returns the new database connection to the request processor of the request manager 110 that did not have a corresponding available database connection. The request processor can now access the database with the newly returned database connection generated by the database connection builder 206.

Figure 3:
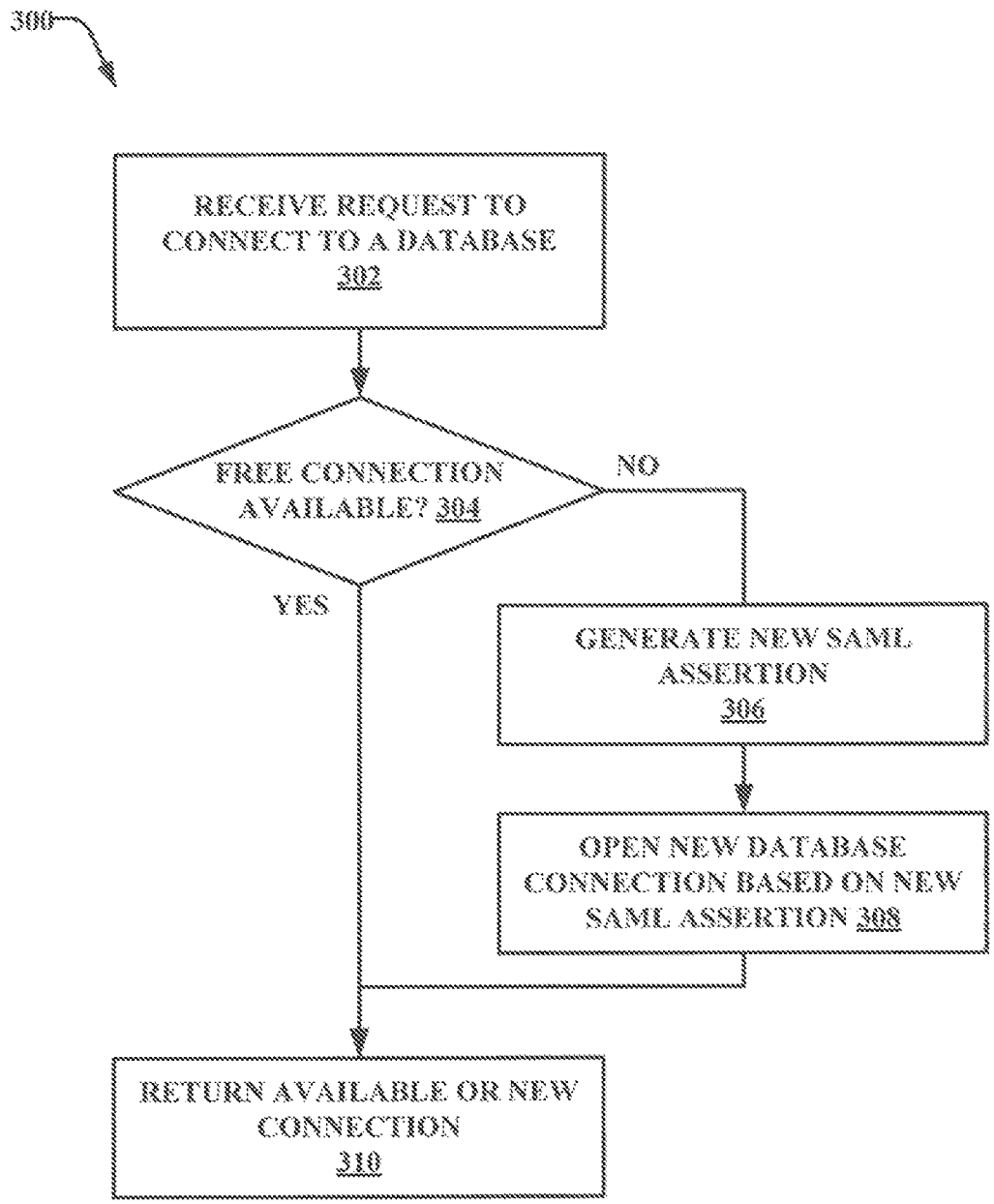
FIG. 3 is a flowchart of a method, in accordance with an example embodiment, for building a data base pool connection based on a security assertion mark-up language (SAML).

FIG. 3 is a flowchart of a method, in accordance with an example embodiment, for building a database pool connection based on a security assertion mark-up language (SAML) assertion.

At operation 302, a request is received from a request processor of a database connection pool to access a database. For example, a web server receives a request from a client to connect with the database. The web server may include a request manager to handle the request from the client. The request manager may be coupled to a database connection pool manager.

At operation 304, the database connection pool manager determines whether a database connection from the database connection pool is available for the request. The database connection pool may include several database connections where each of the database connection has a corresponding request processor based on their corresponding SAML assertion. The database connection pool manager determines whether a database connection is available from the database connection pool. If a database connection is available, the available database connection from the database connection pool is assigned to the request.

At operation 306, the database connection pool manager asks for a new SAML assertion from the identity provider when the database connection pool does not have an available database connection for the request. In one embodiment, an empty string is used as a username and a SAML assertion is used as a password in database connection properties of the database connection pool to build the new database connection. The SAML assertion automatically expires within a predefined time.

At operation 308, the database connection pool manager builds a new database connection to the database using the new SAML assertion. In one embodiment, existing database connections from the database connection pool are maintained active while building the new database connection using the new SAML assertion.

At operation 310, the new database connection is returned to the request processor where the request processor connects with the database using the new database connection.

Certain embodiments described herein may be implemented as logic or a number of modules, engines, components, or mechanisms. A module, engine, logic, component, or mechanism (collectively referred to as a "module") maybe a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configure by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configure circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structure to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 4:
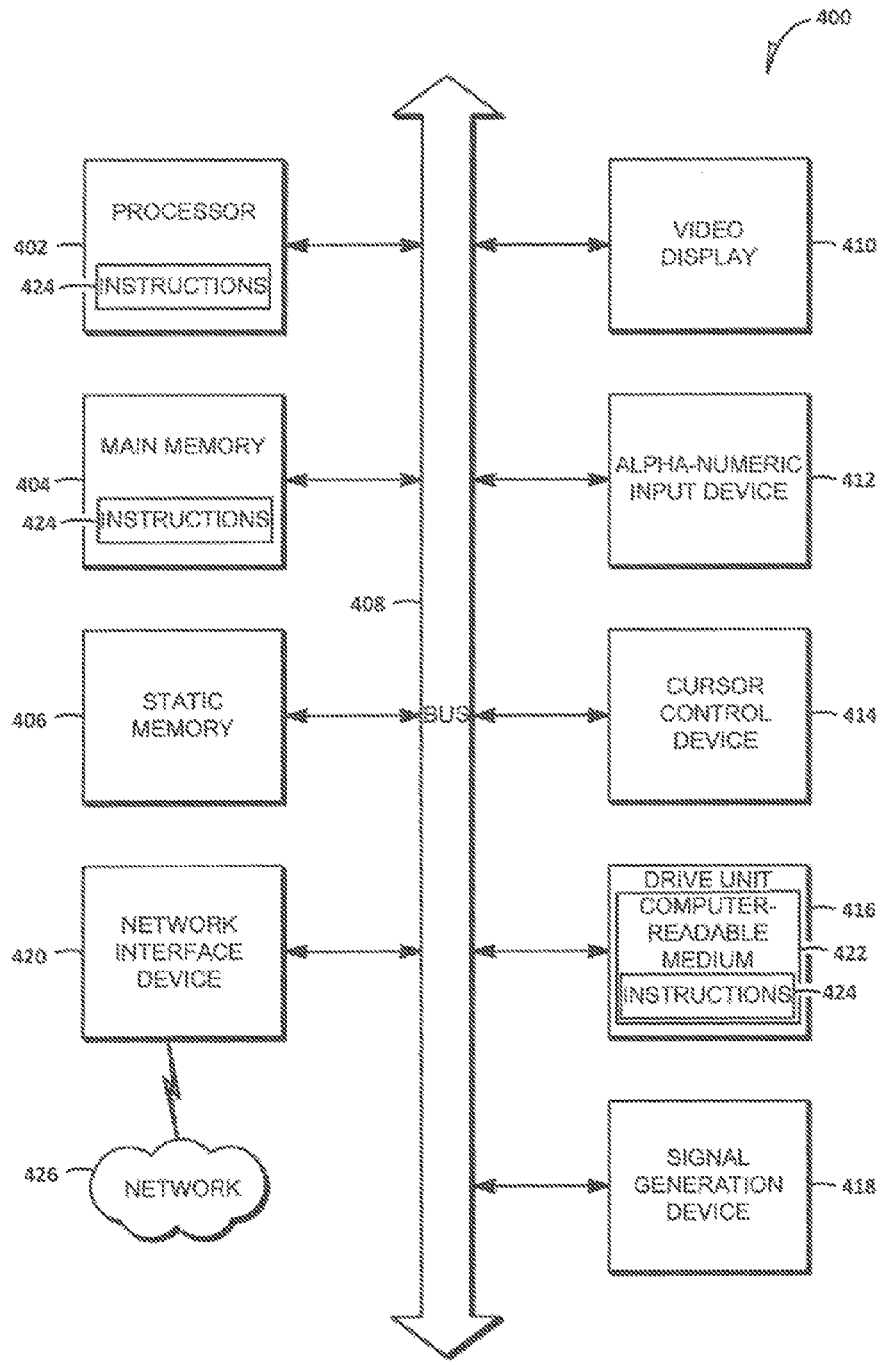
FIG. 4 is a block diagram of a machine in an example form of a computing system within which a set of instructions for causing the machine to perform any one or more of the methodologies discussed herein may be executed.

With reference to FIG. 4, an example embodiment extends to a machine in the example form of a computer system 400 within which instructions 424 for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a sever, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alphanumeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a computer-readable storage medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the computer-readable storage medium 422 is shown in an exemplary embodiment to be a single medium, the term "computer-readable storage medium" may include a single storage medium or multiple media (e.g., a centralized or distributed database, or associated caches and servers) that store the one or more instructions 424. The term "computer-readable storage medium" shall also be taken to include any tangible medium that is capable of storing, encoding, or carrying instructions for execution by the machine and that causes the machine to perform any one or more of the methodologies of embodiments of the present description, or that is capable of storing, encoding, or carrying data structures used by or associated with such instructions. The term "computer-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a transmission medium via the network interface device 420 and utilizing any one of a number of well-known transfer protocols (e.g., HTTP). Examples of communication networks include a local area network (LAN), a wide area network (WAN), the internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present disclosure.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented a separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A computer-implemented method comprising:
   receiving a request from a request processor of a database connection pool to access a database;
   determining, by a hardware processor of a machine, whether a database connection from the database connection pool is available for the request, each database connection based on a first security assertion mark-up language (SAML) assertion;
   generating a second SAML assertion in response to determining that the database connection pool does not have an available database connection for the request;
   building a new database connection to the database using the second SAML assertion based on updated credentials from the first SAML assertion: and
   maintaining existing database connections that are based on the first SAML assertion open, a life cycle of the new database connection independent from a life cycle of the second SAML assertion.

2. The computer-implemented method of claim 1, further comprising:
   returning the new database connection to the request processor; and
   connecting the request processor with the database using the new database connection.

3. The computer-implemented method of claim 1, further comprising:
   assigning an available database connection from the database connection pool to the request.

4. The computer-implemented method of claim 1, further comprising:
   maintaining existing database connections from the database connection pool active while building the new database connection using the second SAML assertion.

5. The computer-implemented method of claim 1, wherein generating the second SAML, assertion further comprises:
   assigning an empty string as a username and the second SAML assertion as a password in database connection properties of the database connection pool to build the new database connection.

6. The computer-implemented method of claim 1, where the second SAML assertion automatically expires within a predefined time.

7. The computer-implemented method of claim 1, wherein the database connection pool comprises a plurality of request processors, each request processor having a corresponding database connection to the database based on their corresponding SAML assertion.

8. A system comprising:
a storage device configured to store a database; and
a processing device configured to receive a request from a request processor of a database connection pool to access the database, to determine whether a database connection from the database connection pool is available for the request, each database connection based on a first security assertion mark-up language (SAML) assertion, to generate a second SAML, assertion in response to determining that the database connection pool does not have an available database connection for the request, to build a new database connection to the database using the second SAML, assertion based on updated credentials from the first SAML assertion; and
maintaining existing database connections that are based on the first SAML assertion open a life cycle of the new database connection independent from a life cycle of the second SAML assertion.

9. The system of claim 8, Wherein the processing device is configured to return the new database connection to the request processor, and to connect the request processor with the database using the new database connection.

10. The system of claim 8, wherein the processing device is configured to assign an available database connection from the database connection pool to the request.

11. The system of claim 8, wherein the processing device is configured to maintain existing database connections from the database connection pool active while building the new database connection using the second SAML assertion.

12. The system of claim 8, wherein the processing device is further configured to assign an empty string as a username and the second SAML assertion as a password in database connection properties of the database connection pool to build the new database connection.

13. The system of claim 8, wherein the second SAML assertion automatically expires within a predefined time.

14. The system of claim 8, wherein the database connection pool comprises a plurality of request processors, each request processor having a corresponding database connection to the database based on their corresponding SAML assertion.

15. A non-transitory machine-readable storage medium storing instructions which, when executed by at least one processor, performs operations comprising:
receiving a request from a request processor of a database connection pool to access a database;
determining whether a database connection from the database connection pool is available for the request, each database connection based on a first security assertion mark up language (SAML) assertion;
generating a second SAML assertion in response to determining, that the database connection pool does not have an available database connection for the request;
building a new database connection to the database using the second SAML assertion based on updated credentials from the first SAML assertion; and
maintaining existing database connections that are based on the first SAML assertion open, a life cycle of the new database connection independent from a life cycle of the second SAML assertion.

16. The storage medium of claim 15, further comprising:
returning the new database connection to the request processor; and
connecting the request processor with the database using the new database connection.

17. The storage medium of claim 15, further comprising:
assigning an available database connection from the database connection pool to the request.

18. The storage medium of claim 15, further comprising:
maintaining existing database connections from the database connection pool active while building the new database connection using the second SAML assertion.

19. The storage medium of claim 15, wherein generating the second SAML assertion further comprises:
assigning an empty string as a username and the second SAML assertion as a password in database connection properties of the database connection pool to build the new database connection.

20. The storage medium of claim 15, wherein the second SAML assertion automatically expires within a predefined time, and the database connection pool comprises a plurality of request processors, each request processor having a corresponding database connection to the database based on their corresponding SAML assertion.

* * * * *